3,487,056
BIS(DIALKYLAMMONIUM)OXALATES AS ACCELERATOR ACTIVATORS IN THE VULCANIZATION OF ELASTOMERS

Harry Elmer Albert and Paul Gordon Haines, Lafayette Hill, Pa., assignors to Pennwalt Corporation, Philadelphia, Pa., a corporation of Pennsylvania
No Drawing. Filed Mar. 13, 1967, Ser. No. 622,421
Int. Cl. C07c *55/06;* C08c *17/28;* C08d *13/28*
U.S. Cl. 260—79.5   5 Claims

ABSTRACT OF THE DISCLOSURE

Bis(dialkylammonium)oxalates and their hydrates, having the following structure:

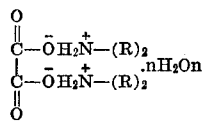

where R is methyl or ethyl, and $n$ is from 0 to about 3 are shown to be especially active accelerator activators useful in the vulcanization of elastomers.

---

It is desirable in the rubber industry to reduce the time and temperature of vulcanization both for the purpose of producing a better quality of elastomer and in order to increase the output of the elastomer from the vulcanization equipment. Toward this end, numerous vulcanization accelerators have been developed, and many of them are so active that vulcanization is complete even at room temperature after a few days or after a few minutes at elevated temperatures. However, activation itself is not the only requirement necessary for a commercial accelerator activator; since the chemical composition must have properties which are compatible with the rubber industry. For example, it is desired that compounds used in this capacity be crystalline solids, easily handled and suitable for use in automatic weighing equipment which is widely used in the rubber industry. Furthermore, the melting ranges of the compounds used must be such that the materials are easily dispersed in the dry mix of elastomer within the temperature range that is normally used for the addition of curing additives. In addition, the compounds must be easily and economically made, stable to storage and shipment have a minimum effect on cure rate at processing temperatures, and, of course, have the necessary activation to make their use of value. In accordance with the present invention, there is provided as accelerator activators for elastomers, bis-dimethyl and bis-diethylammonium oxalates and their hydrates which meet the above requirements and which are, indeed, excellent accelerator activators suitable for commercial development.

Bis-oxalates useful in the invention are prepared readily from oxalic acid. The anhydrous materials are generally prepared in an isopropyl alcohol solvent system, whereas the hydrates are prepared in aqueous systems. The following examples illustrate the preparation of these compounds:

EXAMPLE 1

Anhydrous bis(dimethylammonium)oxalate

At 5–10° C., 90 g. (2.0 moles) of anhydrous dimethylamine was dissolved in 400 ml. of isopropyl alcohol. A solution of 90 g. (1 mole) of oxalic acid in 400 ml. of isopropyl alcohol was then prepared and added with stirring to the dimethylamine solution. The white precipitate which formed was filtered and washed with 100 ml. of cold isopropyl alcohol. The product was dried 2 days in a vacuum desiccator over anhydrous calcium chloride. The yield of white crystalline solid was 169.5 g. (94.2%), M.P. 168–170° C.

*Analysis.*—Percent C=39.7, percent H=9.45, percent N=15.32. Calc'd: percent C=40.0, percent H=8.88, percent N=15.58.

EXAMPLE 2

Bis(dimethylammonium)oxalate trihydrate

Oxalic acid dihydrate (126 g.=1 mole) was gradually added to 226 g. (2 moles) of 40% dimethylamine during cooling in an ice bath to keep the temperature below 60° C. The resulting solution did not precipitate crystals on cooling. Water was removed in a flash evaporator to 75° C. at 30 mm. The resulting water-white oil was poured onto a plate where it quickly solidified to a white solid which weighed 191.5 g. and had a melting range of 55–105° C. This weight did not change on air drying for 3 days. A small portion of crude product was recrystallized from isopropyl alcohol to give material melting at 58–74° C. Analysis indicated this to contain $$78.94\%[(CH_3)_2\overset{+}{N}H_2]_2(O\overset{-}{O}C)_2$$

and thus to correspond to the formula:

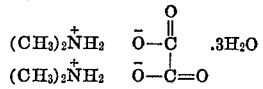

EXAMPLE 3

Bis(dimethylammonium)oxalate sesquihydrate

A 58.8% dimethylamine solution (516 g.=4 moles) was cooled to 15° C. and 252 g. (2 moles) of oxalic acid dihydrate was gradually added while the temperature was maintained at 15–20° C. by cooling in an ice bath. At the end of this addition, all of the oxalic acid had not reacted. The reaction mixture was allowed to warm to room temperature to complete the reaction, a clear solution being obtained after a short time. Water was removed from this solution in a flash evaporator to 70° C. at 15 mm. to give an oil which rapidly solidified on cooling to give a white solid. This weighed 400.5 g. and had a melting range of 56–138° C. Analysis indicated this material to contain $$87.35\%[(CH_3)_2\overset{+}{N}H_2](\overset{-}{O}OC)_2$$

and hence contain 1.46 moles of water of hydration which closely corresponds to a sesquihydrate composition.

EXAMPLE 4

Hydrate of bis(diethylammonium)oxalate

A solution of 156 g. (2 moles) of diethylamine in 150 cc. of water was prepared. To this during stirring and cooling in an ice bath, 126 g. (1 mole) of oxalic acid dihydrate was added. The temperature of the reaction solution was kept below 60° C. during this addition. On cooling the clear reaction solution to 20° C., white solid precipitated. This was filtered off and air dried to give 117.5 g. of product having a melting range of 93–120° C. This filtrate was stripped of water in a vacuum evaporator to give an off-white solid residue which after air drying, weighed 146 g. These two products were combined by grinding together in a mortar (weight=263.5 g.). After air drying 4 days the product weight was 249 g., M.P. 90–122° C. Aanalysis indicated the content of

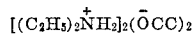

to be 81.12%. Hence the product corresponded to the structure:

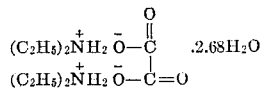

The bis oxalates may be used with natural rubber and with the various synthetic elastomers including the styrene-butadiene rubbers, the acrylonitrile butadiene rubbers, polychloroprene, and other elastomers which are vulcanizable with sulfur, such as, the numerous sulfur vulcanizable dienes and their copolymers with acrylates and the like. The bis-oxalates are particularly useful also for the recently developed elastomeric terpolymers of ethylene, propylene, and a conjugated diene (the well-known EPDM elastomers; see page 15 of Chemical & Engineering News, Jan. 23, 1967) which require a very high cure rate for the proper degree of vulcanization. The amount of bis-oxalate that will be employed will generally be from about 0.1 to about 5 parts per hundred parts of rubber (phr.), preferably from about 0.3 to 2.0 phr.

Evaluation of the oxalates in styrene-butadiene rubber is shown in the following Table I which also includes the test recipe used and indicates in each case the accelerator activator used. This table also shows comparison of the oxalates with a control blank and with two commercial accelerator activators ("Barak" and "Aktone").

TABLE I.—EVALUATION OF PRODUCTS IN SBR

Test Recipe

| | |
|---|---|
| SBR 1606 | 162 |
| SBR 1500 | 100 |
| HAF Black | 52 |
| HA Oil | 10 |
| Zinc oxide | 5 |
| Stearic acid | 3 |
| Sulfur | 2 |
| MBTS | 2 |
| | 174 |

Key: M=Modulus; T=Tensile strength (lbs./sq.); E=Elongation (percent); H=Hardness (Brinell)

Blank

[Mooney scorch at 266° F.; Cure at 302° F.; $T_5$=20 min.]

| Min. | M300 | T | E | H |
|---|---|---|---|---|
| 5 | Did not cure | | | |
| 10 | 200 | 1,375 | 980 | 40 |
| 20 | 775 | 3,175 | 760 | 53 |
| 40 | 1,325 | 3,500 | 620 | 57 |
| 80 | 1,650 | 3,450 | 500 | 60 |

"Barak"=0.75 phr. (dibutylammonium oleate)

[Mooney scorch at 266° F.; Cure at 302° F.; $T_5$=19 min.]

| Min. | M300 | T | E | H |
|---|---|---|---|---|
| 5 | Did not cure | | | |
| 10 | 425 | 2,250 | 860 | 51 |
| 20 | 1,475 | 3,550 | 550 | 59 |
| 40 | 2,025 | 3,450 | 450 | 61 |
| 80 | 2,025 | 3,100 | 410 | 63 |

"Aktone"=0.75 phr. (a urea complex)

[Mooney scorch at 266° F.; Cure at 302° F.; $T_5$=14 min.]

| Min. | M300 | T | E | H |
|---|---|---|---|---|
| 5 | 425 | 2,000 | 900 | 51 |
| 10 | 1,575 | 3,600 | 570 | 60 |
| 20 | 2,275 | 3,500 | 400 | 64 |
| 40 | 2,500 | 3,350 | 360 | 64 |
| 80 | 2,850 | 3,375 | 340 | 62 |

Product of Example 2=0.75 phr.(bis(dimethylammonium) oxalate hydrate)

[Mooney scorch at 266° F.; Cure at 302° F.; $T_5$=16 min.]

| Min. | M300 | T | E | H |
|---|---|---|---|---|
| 5 | 250 | 1,050 | 850 | 46 |
| 10 | 1,650 | 3,200 | 470 | 59 |
| 20 | 2,225 | 3,325 | 390 | 63 |
| 40 | 2,450 | 3,300 | 370 | 64 |
| 80 | 2,475 | 3,225 | 360 | 62 |

Product of Example 4=0.75 phr. (bis(diethylammonium) oxalate hydrate)

[Mooney scorch at 266° F.; Cure at 302° F.; $T_5$=17 min.]

| Min. | M300 | T | E | H |
|---|---|---|---|---|
| 5 | 125 | 350 | 1,050 | 40 |
| 10 | 1,175 | 2,675 | 510 | 58 |
| 20 | 1,975 | 2,725 | 350 | 62 |
| 40 | 2,225 | 2,825 | 350 | 63 |
| 80 | 2,325 | 2,625 | 320 | 63 |

Additional tests with styrene-butadiene rubber are shown in Table II. This table also includes the test SBR recipe, and in addition to comparing the anhydrous bis(dimethylammonium)oxalate, also shows the superiority of the compounds of the invention over mono dimethylammonium oxalate and over bis(diphenylguanidinium)oxalate.

TABLE II.—EVALUATION OF VARIOUS OXALATESS AS ACCELERATOR ACTIVATORS IN SBR

Test Recipe

| | |
|---|---|
| SBR 1606 | 162.0 |
| SBR 1500 | 100 |
| HAF Black | 52 |
| HA Oil | 10 |
| Zinc oxide | 5.0 |
| Stearic acid | 3.0 |
| Sulfur | 2.0 |
| MBTS | 1.5 |
| | 173.5 |

Blank

[Mooney scorch at 266° F.; Cure at 302° F.; $T_5$=24.6 min.]

| Min. | M300 | T | E | H |
|---|---|---|---|---|
| 5 | Did not cure | | | |
| 10 | 175 | 375 | 850 | 45 |
| 15 | 425 | 1,350 | 750 | 48 |
| 20 | 600 | 1,975 | 800 | 51 |
| 30 | 925 | 2,775 | 750 | 53 |
| 40 | 1,200 | 3,075 | 650 | 55 |

"Barak" = 1.0 phr. (dibutylammonium oleate)

[Mooney scorch at 266° F.; Cure at 302° F.; $T_5$ = 21.6 min.]

| Min. | M300 | T | E | H |
|---|---|---|---|---|
| 5 | Did not cure | | | |
| 10 | 425 | 1,250 | 750 | 49 |
| 15 | 1,525 | 3,400 | 610 | 56 |
| 20 | 1,975 | 3,450 | 500 | 57 |
| 30 | 2,225 | 3,500 | 450 | 56 |
| 40 | 2,300 | 3,000 | 410 | 58 |

"Aketone" = 1.0 phr. (a urea complex)

[Mooney scorch at 266° F.; Cure at 302° F.; $T_5$ = 10.0 min.]

| Min. | M300 | T | E | H |
|---|---|---|---|---|
| 5 | 1,025 | 2,700 | 700 | 51 |
| 10 | 2,025 | 3,350 | 450 | 60 |
| 15 | 2,800 | 3,075 | 320 | 63 |
| 20 | 2,800 | 3,025 | 320 | 61 |
| 30 | 2,925 | 2,925 | 300 | 63 |
| 40 | 2,900 | 3,025 | 310 | 62 |

Product of Example 1 at 1.0 phr. (anhydrous bis(dimethylammonium oxalate)

[Mooney scorch at 266° F.; Cure at 302° F.; $T_5$ = 14.6 min.]

| Min. | M300 | T | E | H |
|---|---|---|---|---|
| 5 | 975 | 2,575 | 710 | 53 |
| 10 | 2,250 | 3,375 | 420 | 62 |
| 15 | 2,450 | 3,425 | 400 | 63 |
| 20 | 2,675 | 3,475 | 400 | 63 |
| 30 | 2,825 | 3,475 | 360 | 64 |
| 40 | 2,800 | 3,625 | 390 | 63 |

Mono(dimethylammonium)oxalate at 1.0 phr.
[Mooney scorch at 266° F.; Cure at 302° F.; T₅ = 20.8 min.]

| Min. | M300 | T | E | H |
|---|---|---|---|---|
| 5 | Did not cure | | | |
| 10 | 1,050 | 2,800 | 660 | 54 |
| 15 | 1,775 | 3,350 | 520 | 58 |
| 20 | 2,175 | 3,450 | 490 | 60 |
| 30 | 2,275 | 3,425 | 420 | 62 |
| 40 | 2,575 | 3,200 | 400 | 62 |

Bis(diphenylguanidinium)oxalate at 1.0 phr.
[Mooney scorch at 266° F.; Cure at 302° F.; T₅ = 19.8 min.]

| Min. | M300 | T | E | H |
|---|---|---|---|---|
| 5 | Did not cure | | | |
| 10 | 650 | 1,625 | 600 | 51 |
| 15 | 1,550 | 2,375 | 450 | 58 |
| 20 | 1,775 | 2,350 | 350 | 60 |
| 30 | 2,225 | 2,325 | 310 | 62 |
| 40 | 2,225 | 2,325 | 310 | 61 |

As can be seen from the above Tables I and II, the bis-oxalate salts of the invention are significantly superior to mono dimethylammonium oxalate and also to the bis(diphenylguanidinium)oxalate, and, in fact, are superior to the commercial agents "Barak" and "Aktone," either in actual activator activity or in ease of processing and in being less scorchy.

Evaluation of the products in EPDM rubber is shown in Table III.

TABLE III.—EVALUATION OF BIS-OXALATES SALTS IN EPDM RUBBER

Test Recipe

| | |
|---|---|
| Enjay EPT 3509 | 100 |
| FEF Black | 100 |
| Naphthenic oil | 40 |
| Zinc oxide | 5 |
| Stearic acid | 1 |
| Sulfur | 1.5 |
| Methyl thiram | 1.0 |
| MBT | 0.5 |
| | 248.0 |

Blank
[Mooney scorch at 266° F.; Cure at 320° F.; T₅ = 9 min.]

| Min. | M300 | T | E | H |
|---|---|---|---|---|
| 10 | 1,575 | 1,950 | 460 | 68 |
| 20 | 1,975 | 2,200 | 350 | 69 |
| 40 | | 2,275 | 260 | 71 |
| 80 | | 2,275 | 250 | 73 |

Compression set (40′ cure) in 70 hrs. at 212° F. = 51%.

Product of Example 1 = 1.0 phr.
[Mooney scorch at 266° F.; Cure at 320° F.; T₅ = 7 min.]

| Min. | M300 | T | E | H |
|---|---|---|---|---|
| 10 | 1,600 | 1,925 | 400 | 68 |
| 20 | 2,025 | 2,175 | 310 | 70 |
| 40 | | 2,325 | 250 | 73 |
| 80 | | 2,300 | 250 | 73 |

Product of Example 2 = 1.0
[Mooney scorch at 266° F.; Cure at 320° F.; T₅ = 6 Min.]

| Min. | M300 | T | E | H |
|---|---|---|---|---|
| 10 | 1,650 | 2,000 | 410 | 70 |
| 20 | | 2,100 | 280 | 72 |
| 40 | | 2,125 | 250 | 73 |
| 80 | | 2,125 | 250 | 74 |

Compression set (40′ cure) in 70 hrs. at 212° F. = 45%

Another advantage of the bis oxalate salts used in the invention is the improved compression set values that results when they are used in EPDM elastomers. This is shown in the following Table IV which shows the results obtained using the test recipe of Table III modified with the amounts of methyl thiram shown.

TABLE IV

Methyl Thiram = 1.0 phr. Product of Example 1 = 2.0 phr.
[Mooney scorch at 266° F.; Cure at 320° F.; T₅ = 5 min.]

| Min. | M300 | T | E | H |
|---|---|---|---|---|
| 10 | 1,675 | 1,925 | 370 | 70 |
| 20 | | 1,975 | 280 | 72 |
| 40 | | 2,075 | 250 | 72 |
| 80 | | 2,150 | 230 | 72 |

Compression set (40′ cure) in 70 hrs. at 212° F. = 42%.
Results with product of Example 2=2.0 phr. are similar to those given above.

Methyl Thiram = 3.0 phr.
[Mooney scorch at 266° F.; Cure at 320° F.; T₅ = 12 min.]

| Min. | M300 | T | E | H |
|---|---|---|---|---|
| 10 | 1,900 | 2,025 | 320 | 72 |
| 20 | | 2,125 | 260 | 72 |
| 40 | | 2,225 | 220 | 72 |
| 80 | | 2,100 | 200 | 72 |

Compression set (40′ cure) in 70 hrs., at 212° F. = 49%.

As can be seen from the data, the compression set value where the bis oxalate salt is used in conjunction with methyl thiram (3.0 phr. total) is significantly better than an equivalent amount of methyl thiram above.

It will be understood that numerous changes may be made from the above description and examples without departing from the spirit and scope of the invention.

We claim:
1. In the process of curing elastomers with sulfur, the improvement which comprises incorporating in said elastomer an accelerator activating amount of a bis-oxalate of the structural formula

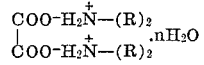

where R is methyl or ethyl and $n$ is from 0 to about 3.

2. A process as in claim 1 where the bis-oxalate is anhydrous bis(dimethylammonium)oxalate.

3. A process as in claim 1 where the bis-oxalate is a bis(dimethylammonium)hydrate.

4. A process as in claim 1 where the elastomer is a styrene-butadiene elastomer and the bis-oxalate is a hydrate of bis(dimethylammonium)oxalate.

5. A process as in claim 1 where the elastomer is an ethylene-propylene terpolymer and R is methyl.

References Cited

UNITED STATES PATENTS

| | | | |
|---|---|---|---|
| 1,698,715 | 1/1929 | Cadwell | 260—782 |
| 2,131,126 | 9/1938 | ter Horst | 260—782 |
| 2,480,814 | 8/1949 | Punshon et al. | 260—794 |
| 3,317,918 | 5/1967 | Foster | 260—83.7 |
| 3,335,118 | 8/1967 | Kanavel et al. | 260—86.1 |

OTHER REFERENCES

Blokh, G. A., et al., Chem. Abst., 54, 10372e.

JOSEPH L. SCHOFER, Primary Examiner

C. A. HENDERSON, Jr., Assistant Examiner

U.S. Cl. X.R.

260—41.5, 793, 785, 795, 797